(12) United States Patent
Sawicki et al.

(10) Patent No.: US 7,231,598 B1
(45) Date of Patent: Jun. 12, 2007

(54) USER INTERFACE FOR EDITING DOCUMENTS CONTAINING MARKUP LANGUAGE

(75) Inventors: Marcin Sawicki, Kirkland, WA (US); Robert Little, Redmond, WA (US); Anthony Douglas Krueger, Woodinville, WA (US); Ziyi Wang, Redmond, WA (US); Brian Jones, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 10/665,444

(22) Filed: Sep. 18, 2003

(51) Int. Cl.
*G06F 15/00* (2006.01)
*G06F 17/21* (2006.01)
*G06F 7/00* (2006.01)

(52) U.S. Cl. .................. 715/513; 715/529; 715/530; 707/10

(58) Field of Classification Search .......... 715/513, 715/500, 514, 529, 530; 345/853, 740, 581; 707/100, 101, 103 R; 709/203, 217
See application file for complete search history.

(56) References Cited

U.S. PATENT DOCUMENTS

| | | | |
|---|---|---|---|
| 5,579,466 A * | 11/1996 | Habib et al. ............... | 715/529 |
| 5,694,610 A | 12/1997 | Habib et al. | |
| 5,760,770 A | 6/1998 | Bliss et al. | |
| 6,067,551 A | 5/2000 | Brown et al. | |
| 6,199,081 B1 | 3/2001 | Meyerzon et al. | |
| 6,415,305 B1 | 7/2002 | Agrawal et al. | |
| 6,516,322 B1 | 2/2003 | Meredith | |
| 6,594,823 B1 | 7/2003 | Corbin et al. | |
| 6,778,989 B2 * | 8/2004 | Bates et al. ................ | 707/10 |
| 2003/0030645 A1 * | 2/2003 | Ribak et al. ............... | 345/581 |
| 2003/0126558 A1 * | 7/2003 | Griffin ...................... | 715/513 |
| 2003/0177443 A1 * | 9/2003 | Schnelle et al. ........... | 715/513 |
| 2004/0205644 A1 * | 10/2004 | Shaughnessy et al. ...... | 715/530 |

OTHER PUBLICATIONS

Paolo et al. "XLinkProxy: External Linkbases with Xlink" Published by Department of Computer Science University of Bologna, Bologna Italy Nov. 8-9, 2002 (hereinafter Paolo), pp. 57-65.*
AbiWord Schema at www.abisource.com/awml.xsd published location at www.w3.org/2OOO/10/XMLSchema and the XSD for AbiWord, pp. 1-3.*

(Continued)

*Primary Examiner*—William Bashore
*Assistant Examiner*—Maikhanh Nguyen
(74) *Attorney, Agent, or Firm*—Merchant & Gould

(57) ABSTRACT

A method, apparatus, and computer-readable medium for editing an electronic document containing markup language tags are provided. According to the method, a computer application program for editing an electronic document operates in one of two editing modes. In a first editing mode, any markup language tags contained within the document are displayed. In a second editing mode, the markup language tags are not displayed. However, when operating in the second editing mode, a determination is made as to whether any of the markup language tags are empty. For each of the tags that are empty, a placeholder is displayed. The placeholder may comprise the name of the tag or a user-defined text string. The placeholder may be selected and utilized to insert data into the tag, delete the tag, or move the tag without viewing the tag itself.

19 Claims, 7 Drawing Sheets

OTHER PUBLICATIONS

Lary Ayers. "AbiWord's Potential" Published in Issue 43 of Linux Gazette. Jul. 199, pp. 1-4□□.*

Schmelzer, Ronald, "ZapThink Brief Note—HyperVision—Automating Valid XML Document Creation Within Microsoft World", ZapThink LLC, Feb. 8, 2002, pp. 1-6.*

Alschuler, Liora, "Getting the Tags In: Vendors Grapple With XML-Authoring, Editing and Cleanup", Seybold Report on Internet Publishing, vol. 5, No. 6, Feb. 2001, pp. 1-6.*

HyperVision, Ltd, "WorX 2.1 Authorizng Guide for XML 2001", Sep. 2001, pp. 1-29.*

Ayers, Larry, "AbiWord's Potential", Linux Gazette, Jul. 1999, pp. 1-4.*

"Celebrate's XML/Designer," *Seybold Report Analyzing Publishing Technologies*, Seybold Publications, vol. 2, No. 18, Dec. 2002, p. 23.

Muto, Kazuo, "Advanced Technology For Manufacturing Engineering Development: XML Technology On A System That Enables User to View Required Information From The Work Shop Through A Web Browser," *Dept. of Rehabilitation Engineering Faculty of Engineering Polytechnic University*, Sagamihara, Kanagawa Japan, vol. 24, No. 3, Jul. 2003, p. 303-312.

Nam, Chul-Ki; Jang, Gil-Sang; Bae, Jae-Hak J., "An XML-Based Active Document For Intelligent Web Applications," *School of Computer Engineering and Information Technology, Univ. of Ulsan*, South Korea,, vol. 25, No. 2, Aug. 2003, p. 165-176.

Pihkala, K.; Honkala, M.; Vuorimaa, P., "A Browner Framework For Hybrid XML Documents," *Telecommunications Software & Multimedia Laboratory*, Helsinki University of Technology, Espoo, Finland, Proceedings of the Sixth IASTED International Conference Internet and Multimedia Systems and Applications, 2002, p. 164-169.

\* cited by examiner

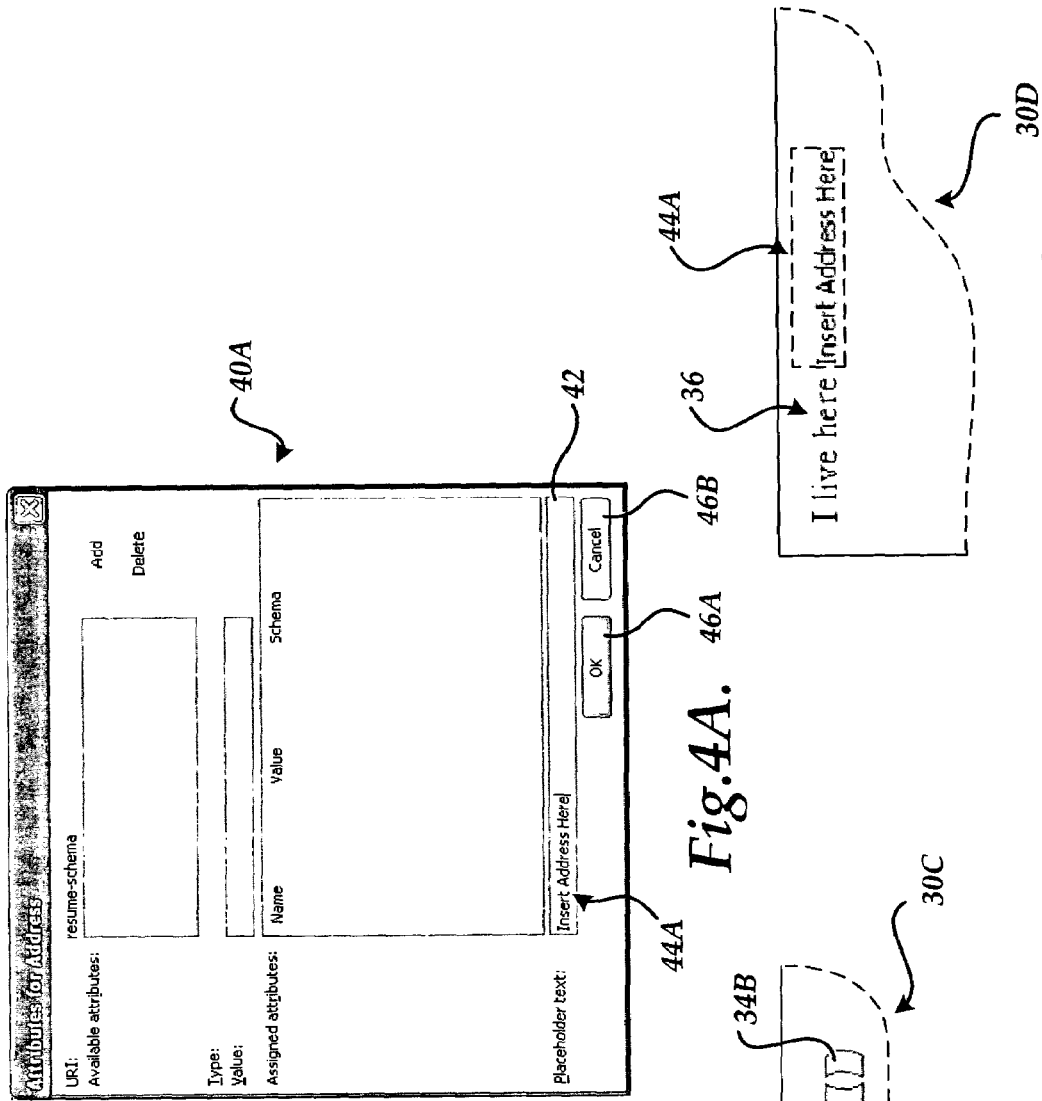
*Fig.4A.*
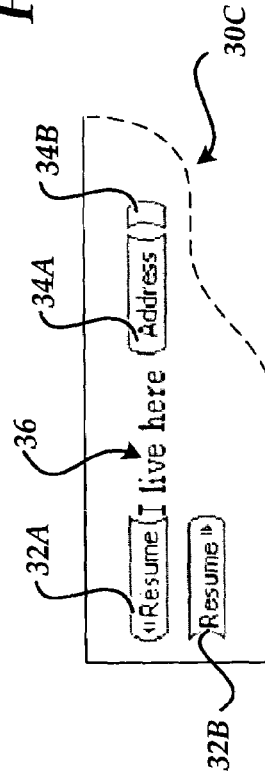
*Fig.4C.*
*Fig.4B.*

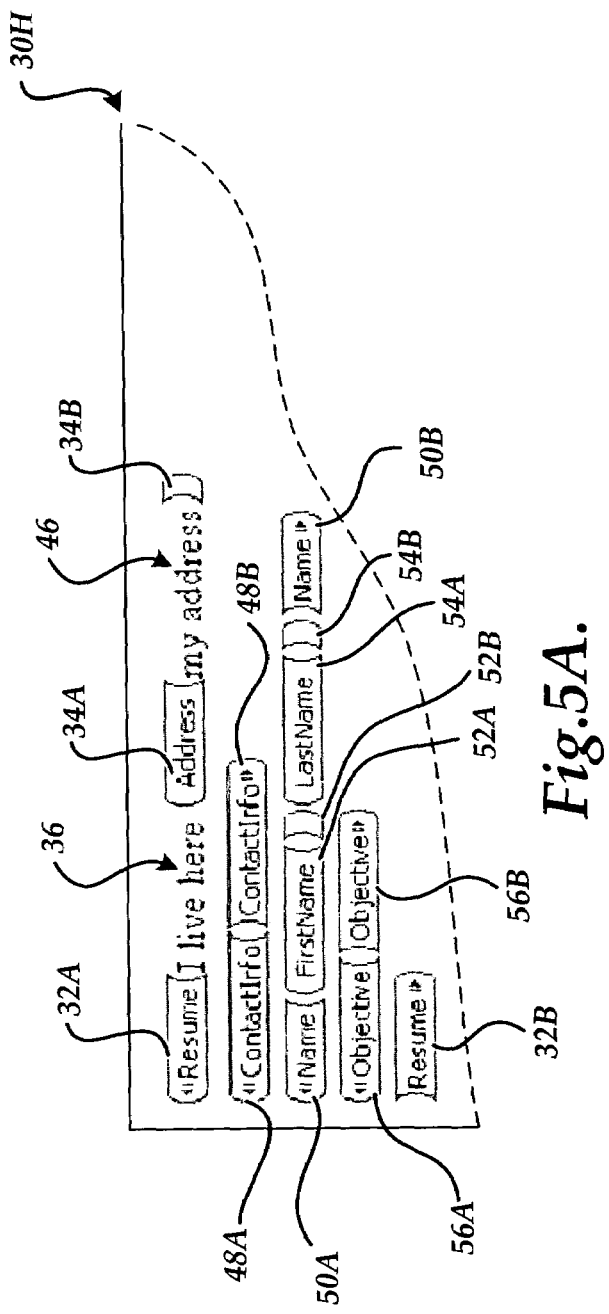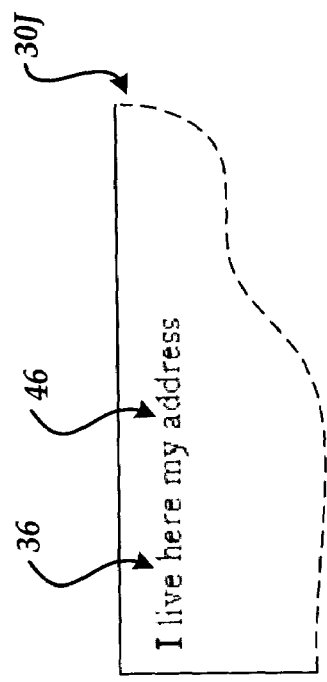
Fig.5A.
Fig.5B.

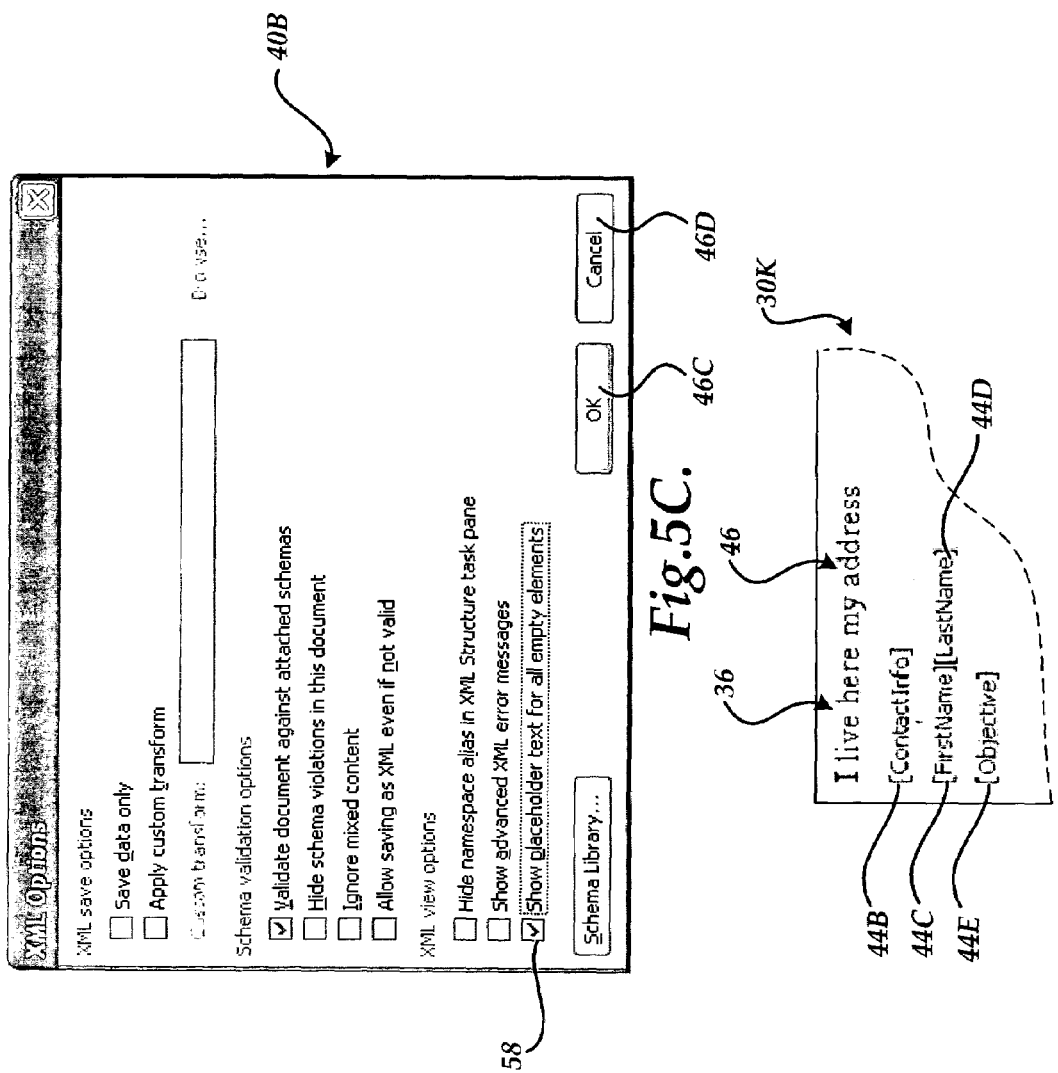

USER INTERFACE FOR EDITING DOCUMENTS CONTAINING MARKUP LANGUAGE

TECHNICAL FIELD

The invention generally relates to the field of electronic document editing and, more specifically, to the field of user interfaces for editing documents containing markup language.

BACKGROUND OF THE INVENTION

With the advent and explosion of the Internet, a number of technologies that facilitate the interchange of data have become widely utilized. One of these technologies, extensible markup language ("XML"), has become a foundational building block which makes possible a wide variety of different types of document processing and exchange. For instance, XML can be used to encapsulate any kind of structured information in order to pass the information between computing systems that would otherwise be unable to communicate.

In order to facilitate the creation and editing of documents containing XML, and other markup languages, software tools have been created or adapted to provide XML editing features. In particular, some word processing applications ("word processors") have been adapted to allow an XML schema to be attached to a word processing document. Once the XML schema has been attached, XML tags may be added to the data contained in the word processing document. Although features for adding and editing XML to word processing documents have been added to some word processors, the user experience for utilizing these features and editing a document containing XML could be improved.

One reason previous interfaces for editing documents containing XML have been less than satisfactory stems from the fact that many users are not familiar with XML and, in fact, have no desire or need to understand XML. For instance, a word processing document form may be created for use within a corporation that employees are required to complete. The data contained on the form may include, for instance, an employee's home address and telephone number. The address and telephone number may be tagged with XML that identifies the data as such. If the tags are displayed to an employee that is not familiar with XML, the employee may be confused and have difficulty completing the form. However, if the tags are not displayed to the employee when completing the form, the employee may type the information outside of the tags, thereby rendering the XML meaningless.

It is with respect to these considerations and others that the various embodiments of the present invention have been made.

SUMMARY OF THE INVENTION

In accordance with the present invention, the above and other problems are solved by an improved method and apparatus for editing electronic documents that contain markup language tags. According to the methods provided herein, a user can more easily and accurately edit documents containing markup language without having to view the markup language tags while editing. Moreover, utilizing various aspects of the invention, a user can easily determine the appropriate location within an electronic document to enter data into a markup language tag without having to actually view the tag itself. A user can also delete and move markup language tags without having to view the tags.

According to one aspect of the invention, a method is provided for editing an electronic document containing one or more markup language tags, such as XML tags. The method is utilized within a computer application program for editing the electronic document. According to the method, a placeholder may be associated with some or all of the markup language tags contained within the document. The placeholder may comprise text, an image, or other type of viewable object. When the computer application program is utilized to edit the electronic document, the markup language tags contained within the document are not displayed. Rather, the placeholder for each empty tag is displayed in a location that indicates the location of the tag within the document. The placeholder for each tag may be the name of the tag or a user-defined text string may be specified and utilized as the placeholder for each tag. If a user-defined placeholder is available for an empty tag, the user-defined text is displayed as the placeholder rather than the tag name. The definition of user-defined text includes annotations to an XML Schema Definition ("XSD"); configuration files; schema library entries; or any other method of associating information with an XML element. The user-defined text also includes images, shapes, or any other type of content that is available in the editing environment. Otherwise, the name of the tag may be displayed as the placeholder for an empty tag.

According to other aspects of the method, a mouse, keyboard, or other type of input device may be utilized to select the placeholder. After selection, any typed data will cause the placeholder to be hidden and the typed data to be inserted into the tag. If the typed data is later deleted, the placeholder will again be displayed. In this manner, a user can type data into a markup language tag without having to actually see the location of the tag itself. Similarly, if a placeholder is selected and a delete request is received, such as the selection of a delete key on a keyboard, the placeholder and the tag itself are deleted. In this manner a tag may be deleted by a user without viewing the tag.

According to another aspect of the invention, another method for editing an electronic document containing markup language tags is provided. According to the method, a computer application program for editing an electronic document operates in one of two editing modes. In a first editing mode, any markup language tags contained within the document are displayed along with the other contents of the document. This mode may be utilized to view and modify the tag structure contained within the document directly. In a second editing mode, markup language tags are not displayed with the other contents of the document. This mode is similar to a traditional word processing user interface experience. However, when operating in the second editing mode, a determination is made as to whether any of the markup language tags are empty. For each of the tags that are empty, a placeholder is displayed. The placeholder may comprise the name of the tag, a user-defined text string, an image, or other type of viewable object.

While operating in the second editing mode, a placeholder may be selected, for instance by using a mouse or other pointing device. Thereafter, any typed data will be inserted into the tag and the selected placeholder will be deleted. If a delete command is issued while a placeholder is selected, the tag and the placeholder will be deleted from the document. The placeholder may also be utilized to move the location of the tag within the document such as, for instance, by selecting the placeholder and performing a "drag and drop" operation. If text typed into the tag is removed, the placeholder will again be displayed. The markup language placeholder allows a user unfamiliar with markup language tags to type data into the correct location within a tag, to delete a tag, and to move a tag, all without having to actually view or interact with the tag itself.

The invention may be implemented as a computer process for editing electronic documents containing markup language, a computing system for editing documents containing markup, or as an article of manufacture such as a computer program product or computer readable media. The computer program product may be a computer storage media readable by a computer system and encoding a computer program of instructions for executing a computer process for providing the user interface. The computer program product may also be a propagated signal on a carrier readable by a computing system and encoding a computer program of instructions for executing a computer process.

These and various other features, as well as other advantages, which characterize the present invention, will be apparent from a reading of the following detailed description and a review of the associated drawings.

BRIEF DESCRIPTION OF THE DRAWINGS

FIGS. 4A–5D are user interface diagrams illustrating various user interfaces and the features contained therein provided by and utilized within the embodiments of the present invention described herein.

DETAILED DESCRIPTION OF THE INVENTION

Figure 1:
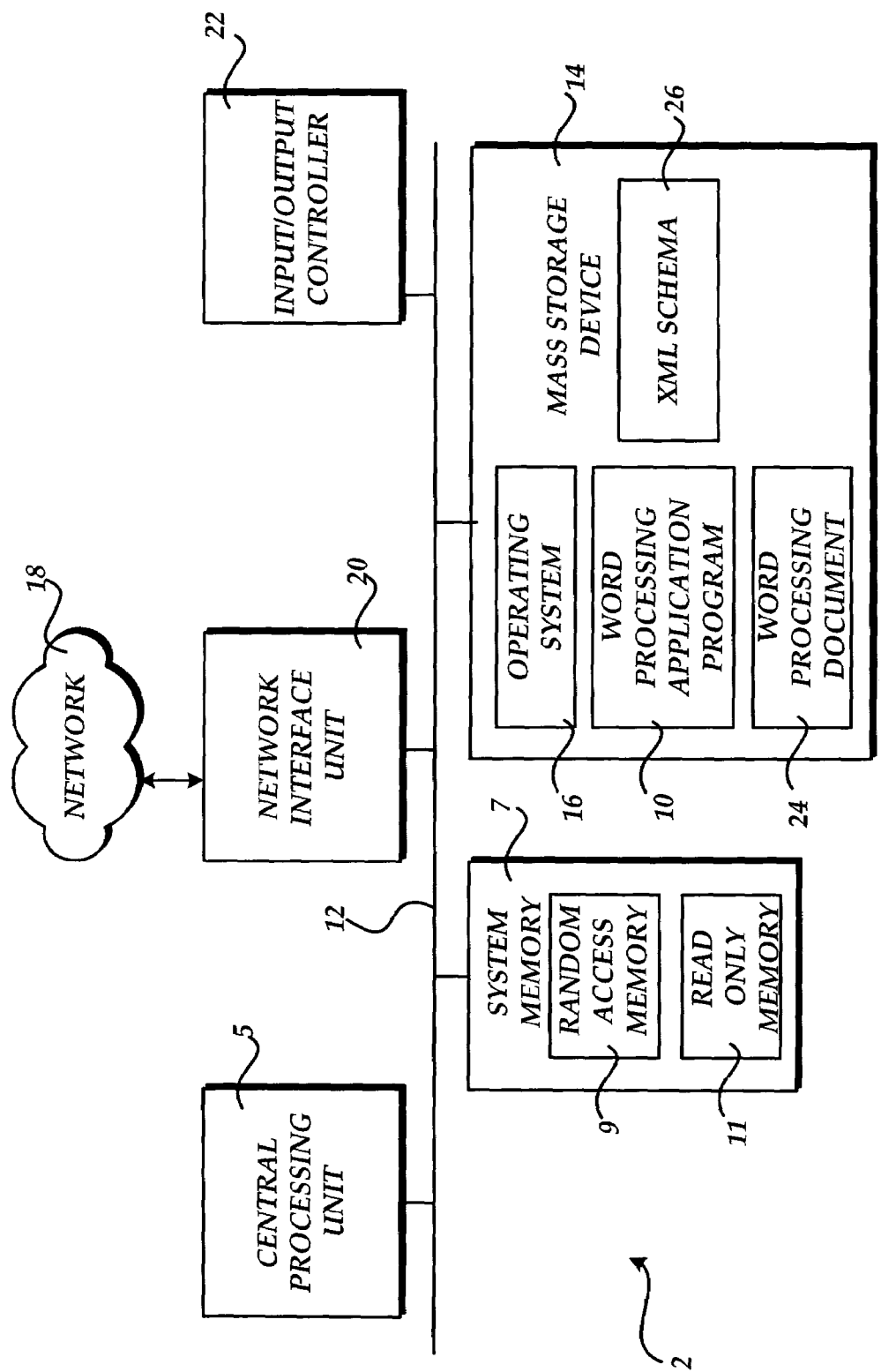
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers, such as an e-mail server computer, through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. As known to those skilled in the art, the word processing application program 10 is operative to provide functionality for creating and editing electronic documents, such as the word processing document 24. According to one embodiment of the invention, the word processing application program 10 comprises the WORD word processing application program from MICROSOFT CORPORATION. It should be appreciated, however, that other word processing application programs from other manufacturers may be utilized to embody the various aspects of the present invention.

In conjunction with the editing of a word processing document 24, the word processing application program 10 provides functionality for "marking up" the word processing document 24 with XML tags. In this regard, an XML schema 26 may be associated with the word processing document 24 and utilized to validate any XML markup contained within the word processing document 24. It should be appreciated that although the embodiments of the invention are described in the context of XML contained within an electronic document, the invention is equally applicable to electronic documents containing other types of markup languages such as hyper-text markup language ("HTML"), SGML, and others.

Figure 2A:
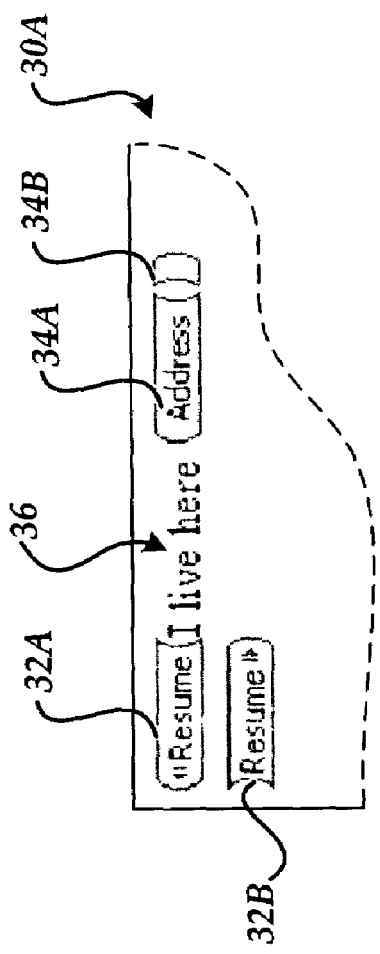
FIGS. 2A–2B are user interface diagrams illustrating the difficulties encountered when editing an electronic document containing markup language tags without using the aspects of the invention provided herein.

As will be described in greater detail below, the word processing application program 10 is operative to permit editing of the document 24 in one of several editing modes. In particular, a "tag editing mode" is provided in which the markup language tags contained in the document 24 are displayed in conjunction with the remainder of the contents of the document 24. Through the use of the tag editing mode, a user can view the structure of the tags contained within the document 24 and edit the tags and their contents directly. In this regard, FIG. 2A illustrates a portion of a user interface 30A provided by the word processing application program 10 while operating in the tag editing mode. As shown in FIG. 2A, the document being edited includes a number of XML tags and some content. In particular, the example document shown in FIG. 2A includes a basic schema for a resume including a "resume" tag 32A–32B and an "address" tag 34A–34B (beginning and ending XML tags are referred to herein collectively as a "tag" or an "element"). The tag 32A–32B includes text 36 ("I live here") and the tag 34A–34B is empty.

Figure 2B:
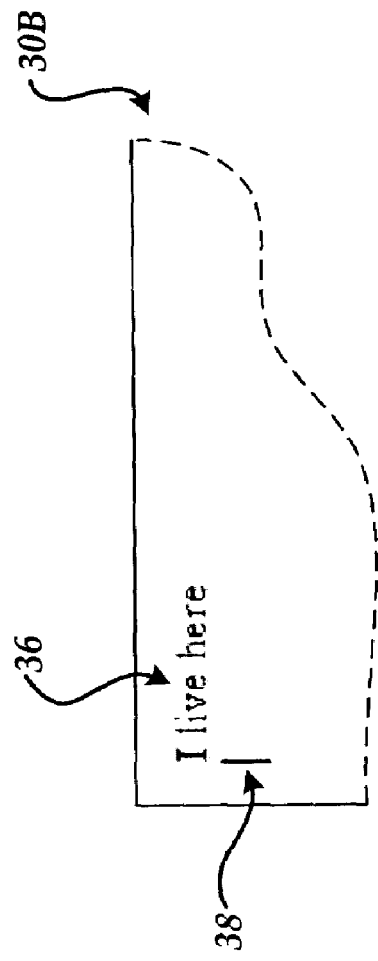

While operating in the tag editing mode illustrated in FIG. 2A, a user can easily type directly within a tag, delete a tag, move a tag, and perform other operations on the tags and their content. However, as described above, many users are not familiar with markup language tags and may be confused by their presence in a document. Accordingly, the word processing application program 10 also provides a "traditional editing mode" in which the markup language tags are not displayed. In this regard, FIG. 2B illustrates the same document as illustrated with respect to FIG. 2A. However, in FIG. 2B, the user interface 30B illustrates the screen display provided by the word processing application program 10 when operating in the traditional editing mode without markup language tags being displayed. In the traditional mode, the text 36 is displayed along with the insertion point 38. The insertion point 38 is the point at which new characters will be added or existing characters deleted.

Because the tags are not shown in the user interface 30B, it can be very difficult for a user to know where to place the insertion point 38 to type into any of the tags 32A–32B and 34A–34B. Moreover, the user cannot be certain as to how to delete the markup language tags or to move the tags. The only way to perform these functions would be to switch back to the tag editing mode. This, however, is unacceptable for some users. Accordingly, the embodiments of the present invention provided herein include an improved user interface that allows a user to insert content into tags, to delete tags, and to move tags without requiring the user to utilize the tag editing mode. Additional details regarding the improved user interface provided herein are provided below with respect to FIGS. 3–5D.

Figure 3:
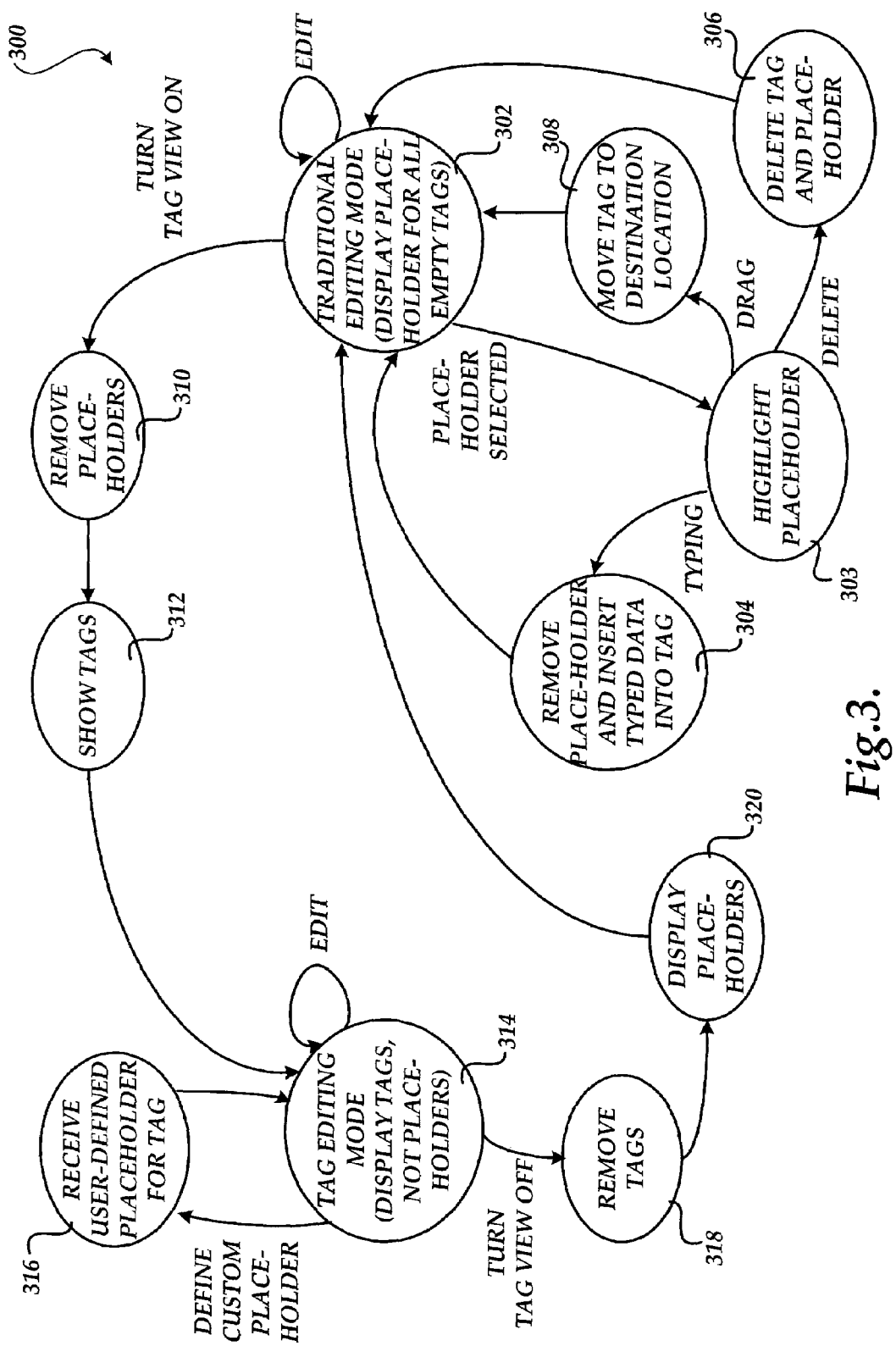
FIG. 3 is a state diagram illustrating a process for editing an electronic document containing markup language provided by the various embodiments of the present invention.

Referring now to FIG. 3, a state machine 300 will be described illustrating an exemplary process performed by the word processing application program 10 for editing electronic documents containing markup language tags. FIG. 3 will be described in the context of the user interface screen diagrams presented in FIGS. 4A–5D.

When reading the discussion of the state machine 300 presented in FIG. 3, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

As illustrated in FIG. 3, the word processing application program 10 allows a document 24 to be edited in one of two possible editing modes. State 302 represents the traditional editing mode wherein markup language tags contained in the document 24 are not displayed. The remainder of the content of the document 24, however, is displayed and may be edited freely by a user. As will be described in greater detail below, placeholders are provided and displayed for each markup language tag while operating in the traditional editing mode.

State 314 represents the tag editing mode. As discussed above, while operating in the tag editing mode, the word processing application program 10 displays the markup language tags along with the other contents of the document 24. The user can directly edit the tags contained in the document or add new tags to the document. The remainder of the content of the document 24 is also displayed and may be edited freely by a user. As will be described in greater detail below, the placeholders are not displayed while operating in the tag editing mode represented by state 314.

As discussed briefly above, while operating in the traditional editing mode represented by state 302, the word processing application program 10 displays placeholders for each of the markup language tags in the document 24 that is empty. A placeholder comprises text, an image, formatting, or another type of viewable object that can be displayed with the other content of the document 24 to represent the location of the corresponding tag.

A placeholder may be specified in several different ways. In particular, as shown in FIG. 5C, a user interface dialog box 40B may be provided by the word processing application program 10 for specifying options relating to the handling of markup language within a word processing document. In particular, the user interface dialog box 40B may include a check box 58 that, when selected, will cause a placeholder to be shown for all empty tags when operating in the traditional editing mode. If no other placeholder text has been specified for a tag, the name of the tag will be utilized as the placeholder. Once a user has completed selecting options from the user interface dialog box 40B, the user may select the button 46C to accept the changes or the button 46D to ignore the changes.

In another embodiment of the invention, user-defined placeholder text may be specified for each markup language tag in a document. In this embodiment, a user may select a particular tag while viewing the document in the tag editing mode represented by state 314. The user may then request that a user-defined placeholder be defined for the tag by making an appropriate selection from a pull-down menu or contextual menu for the tag. In response to such a selection, the user may be presented with the user interface dialog box 40A shown in FIG. 4A. As shown in FIG. 4A, the user interface dialog box 40A provides a facility for setting attributes on the selected markup language tag. In particular, the user interface dialog box 40A includes a text box 42 for specifying user-defined placeholder text. For example, as shown in FIG. 4A, the placeholder 44A has been specified as "Insert Address Here." This occurs at state 316 shown in FIG. 3. Once the button 46A has been selected to accept the changes, the placeholder 44A will be shown for the selected tag if the selected tag is empty and the word processing application program 10 is operating in the traditional editing mode. Alternatively, the button 46B may be selected to ignore the changes.

FIG. 4B further illustrates the sample document described above with respect to FIG. 2B. In this example, the user has selected the "address" tag 34A–34B, and requested that a user-defined placeholder be assigned to the tag. The user interface dialog box 40A shown in FIG. 4A is then used to assign the text "Insert Address Here" as the user-defined placeholder for the tag 34A–34B. When the user then returns to the traditional editing mode, as shown in state 302, the user interface 30D shown in FIG. 4C is displayed. As shown in FIG. 4C, the placeholder 44A specified by the user in the dialog box 40C is displayed. The placeholder 44A is highlighted or otherwise distinguished to convey to the user that the placeholder 44A is not document content.

While operating in the traditional editing mode, a user may select the placeholder utilizing a mouse cursor or by moving the insertion point into the area defined by the placeholder. When such a selection occurs, a transition from state 302 to state 303 occurs. At state 303, the placeholder is inverted or otherwise highlighted to indicate to the user that the placeholder 44A has been selected. This is illustrated in the user interface 30E shown in FIG. 4D.

Once the placeholder 44A has been selected, a user may begin typing. If the user does begin typing, the state machine 300 transitions from state 303 to state 304. At state 304, the insertion point is moved to a location within the tag corresponding to the selected placeholder and the typed data is inserted into the tag. Because the tag is no longer empty, the placeholder will not be displayed for the tag. However, the placeholder is not deleted. Rather, the value of the placeholder is retained so that it may be displayed again in the event that the contents of the tag are deleted.

Figure 4E:
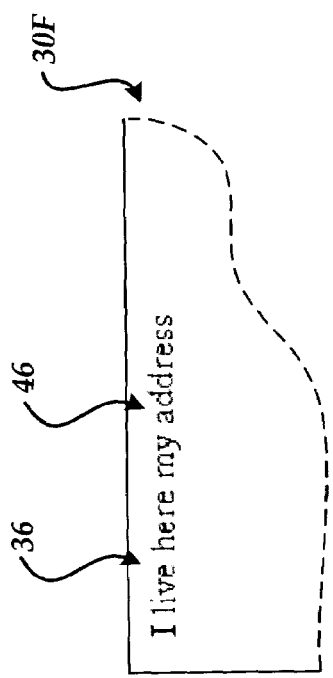
Figure 4D:
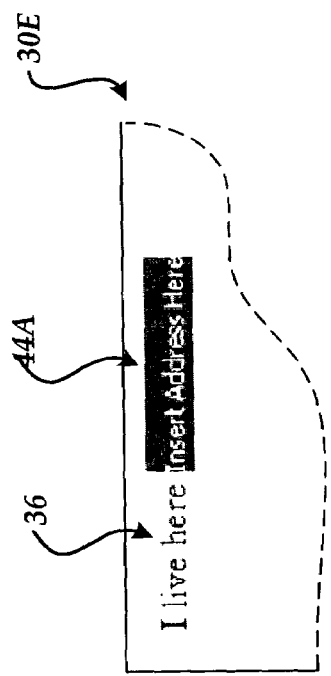
Figure 4F:
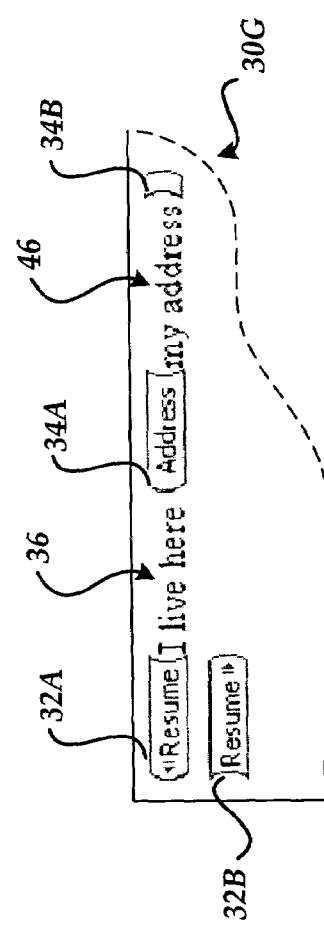

FIGS. 4D, 4E and 4F illustrate the effects of typing following the selection of the placeholder 44A. In FIG. 4D, the placeholder 44A has been selected. In FIG. 4E, the user has typed the text "my address", thereby replacing the placeholder 44A with the text "my address." In FIG. 4F, the user has returned to the tag editing mode to view the effects of the selection and typing on the markup language tags. As shown in FIG. 4F, the text "my address" has been inserted into the tag 34A–34B. Accordingly, in this manner a user can insert content into a tag without having to actually view the tag itself. Once the user has completed typing, the state machine transitions back to state 302 from state 304.

While the placeholder is selected in state 303, a user may also request that the tag be deleted. This request may be made, for instance, by selecting the delete key on a keyboard. If such a request is made while the placeholder 44A is selected, the state machine 300 transitions from state 303 to state 306, where the tag associated with the selected placeholder is deleted. The state machine 300 then transitions back to state 302 for further editing in the traditional editing mode. In this manner, a user can delete a tag without viewing the tag and without having to return to the tag editing mode.

A user may also utilize the placeholder 44A to move a tag. In particular, the user may select the placeholder by, for instance, selecting the placeholder with a mouse cursor. The user may then perform a "drag and drop" operation on the placeholder. The drag and drop operation will cause not only the placeholder to move, but also the tag associated with the placeholder. This occurs at state 308, shown in FIG. 4. This allows a user to move a tag without viewing the tag and without having to return to the tag editing mode.

It should be appreciated that although FIG. 3 illustrates only a single path for transition between states 302 and 314, this transition may be made at any time. In this manner, a user can switch between the tag editing mode and the traditional editing mode at any time. When the transition is made from state 302 to state 314, the placeholders are removed from the display at state 310 and the markup language tags are displayed at state 312. When the transition is made from state 314 to state 302, the tags are removed from the display at state 318 and the placeholders are displayed for all empty tags at state 320. For simplicity, all of the possible transitions between the various states have not been illustrated in FIG. 3.

The user interface 30H shown in FIG. 5A illustrates a slightly more complex schema in tag editing mode. As shown in FIG. 5A, the simple resume schema described above with reference to FIG. 4F has been modified to include a number of additional tags. In particular, a "contactinfo" tag 48A–48B, a "name" tag 50A–50B, a "firstname" tag 52A–52B, a "lastname" tag 54A–54B, and an "objective" tag 56A–56B have been added to the schema. However, as shown in FIG. 5B, the view of the schema illustrate in FIG. 5A is identical to that displayed in FIG. 4E even though multiple new markup language tags have been added.

It should be appreciated that it would be very difficult for a user to enter text into any of the newly added tags while operating in the traditional editing mode shown in FIG. 5B. However, in order to assist the user in this regard, tag names may be utilized as placeholders for all empty tags while operating in the traditional editing mode as described above. The user interface 30K shown in FIG. 5D illustrates the operation of the word processing application program 10 in the traditional editing mode with the placeholders turned on. As shown in FIG. 5D, the placeholder 44B is displayed for the tag 48A–B, the placeholder 44C is displayed for the tag 52A–52B, the placeholder 44D is displayed for the tag 54A–54B, and the placeholder 44D is displayed for the tag 56A–56B. It should be appreciated that the user-defined placeholder would be displayed for any of these tags had one been defined. Moreover, it should be appreciated that the placeholders 44B–44D may be acted upon in the manner described above to insert text into, delete, or move the corresponding tag. It should further be appreciated that a placeholder is not shown in FIG. 5D for the tag 50A–50B, because this tag is not empty. The tag 50A–50B includes the tags 52A–52B and 54A–54B.

It should be appreciated that the placeholder for each markup language tag in the document 24 may be saved within the document. The placeholder, however, is not persisted as content because the placeholder is an editing assistance feature and does not actually represent data. The placeholder for each element is therefore saved as an attribute on the element itself. For instance, the resulting XML stored for a tag named "fname" and having an associated placeholder of "First Name" may be "<USO: fname w:placeholder="First Name">Brian</fname>". It should be appreciated that placeholders may also be added to XML documents programmatically by adding appropriate attribute on each element for which a placeholder is desired.

It should also be appreciated that the functionality provided by the placeholder may also be accessed through a document object model provided by the word processing application program 10. In particular, the functionality of the placeholder feature may be enable or disabled by setting a property exposed by a document object through the object model. Similarly, each tag may be exposed through the object model via an element object. Each element object may have a placeholder property which may be utilized to set or retrieve the value of the placeholder for the element.

It should also be appreciated that the placeholder text may be specified in ways other than through the use of a user interface provided by a word processing application program. For instance, other ways of specifying placeholder text include: a separate configuration file; annotations to an XSD schema file; entries in a schema library; or any other method available for associating resources and information with an XML element, element type, or schema.

It should also be appreciated that although the embodiments of the invention described herein are presented in the context of an application program for editing word processing documents containing markup language tags, the invention may be utilized in application programs for editing other types of documents that utilize markup language tags. For instance, the embodiments of the invention described herein may be utilized within a spreadsheet application program, a presentation application program, a drawing or computer-aided design application program, a database application program, or any other application program that permits markup operations through the use of embedded markup language tags.

Based on the foregoing, it should be appreciated that the various embodiments of the invention include a method, system, apparatus, and computer-readable medium for editing an electronic document containing markup language tags. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium which stores a set of instructions which when executed performs a method for editing an electronic document comprising one or more markup language tags, the method executed by the set of instructions comprising:

providing a first editing mode in which the one or more markup language tags are displayed;

associating a placeholder with the one or more of markup language tags;

exposing a property for each tag in the electronic document, wherein the property for each tag to be programmatically set for each tag in the electronic document to assign a placeholder to the tag; and displaying the placeholder for each of the one or more markup language tags that is empty while operating in a second editing mode in which the markup language tags are not displayed wherein displaying the placeholder further comprises, receiving a selection of typed data in the electronic document while operating in the editing mode in which the markup language tags are not displayed, the typed data being associated with the placeholder for a tag;

receiving a delete request for the typed data; and in response to receiving the delete request, removing the typed data and inserting the placeholder for the tag associated with the typed data, and wherein displaying the placeholder further comprises, determining a text identifying a name for the one or more of the markup language tags associated with the placeholder, the text identifying the name being defined in one of the following: a schema library and a configuration file, determining whether a user-defined text string has been previously defined by a user, setting the placeholder equal to the user-defined text string if it was determined that the user-defined text string has been previously defined by the user, setting the placeholder equal to the text identifying the name for the one or more of the markup language tags associated with the placeholder if it was determined that the user-defined text string has not been previously defined by the user;

not displaying the placeholders while operating in the first editing mode;

receiving a selection of the placeholder for a tag;

receiving typed data following the selection of the placeholder for the tag;

in response to receiving the typed data, removing the placeholder for the tag and inserting the typed data within the tag;

determining whether the typed data has been removed;

in response to determining that the typed data has been removed, displaying the placeholder for the tag while operating within the second editing mode; and wherein the text is defined in an XML Schema Definition (XSD) schema file.

2. The method of claim 1, further comprising removing the placeholder while operating in the first editing mode in which the markup language tags are displayed.

3. The method of claim 2, further comprising:

receiving a selection of the placeholder for a tag while operating in the second editing mode in which the markup language tags are not displayed;

receiving typed data following the selection of the placeholder for the tag; and in response to receiving the typed data, removing the placeholder for the tag and inserting the typed data within the tag.

4. The method of claim 3, further comprising:
receiving a selection of the placeholder for a tag while operating in the second editing mode in which the markup language tags are not displayed;
receiving a delete request following the selection of the placeholder for the tag; and
in response to receiving the delete request, deleting the tag and the placeholder for the tag from the electronic document.

5. A computer-readable medium having computer-executable instructions stored thereon which, when executed by a computer, cause the computer to perform the method of claim 1.

6. A computer-controlled apparatus capable of performing the method of claim 1.

7. The method of claim 1, further comprising:
exposing a property for the electronic document, wherein the property for the electronic document may be set to cause the placeholders to be displayed when operating in the second editing mode.

8. The method of claim 1, wherein the user-defined text includes at least one of the following: images, shapes, and any other type of content that is available in an editing environment.

9. In a computer application program for editing an electronic document comprising one or more markup language tags, a method for editing the electronic document, the method comprising:
providing a first editing mode in which the one or more markup language tags are displayed along with other contents of the document;
providing a second editing mode in which the markup language tags are not displayed with other contents of the document;
while operating in the second editing mode, determining whether any of the markup language tags are empty;
exposing a property for each tag in the electronic document, wherein the property for each tag to be programmatically set for each tag in the electronic document to assign a placeholder to the tag;
in response to determining that one or more of the markup language tags are empty, a placeholder for each empty tag is displayed, wherein the placeholder further comprises,
while operating in the second editing mode in which the markup language tags are not displayed, the placeholder is selected by using a mouse or other pointing device;
receiving a delete request for the typed data; and
in response to receiving the delete request, removing the typed data and inserting the placeholder for the tag associated with the typed data, and wherein displaying the placeholder further comprises,
determining a text identifying a name for the one or more of the markup language tags associated with the placeholder,
determining whether a user-defined text string has been previously defined by a user,
setting the placeholder equal to the user-defined text string if it was determined that the user-defined text string has been previously defined by the user,
setting the placeholder equal to the text identifying the name for the one or more of the markup language tags associated with the placeholder if it was determined that the user-defined text string has not been previously defined by the user;
not displaying the placeholders while operating in the first editing mode;
receiving a selection of the placeholder for a tag;
receiving typed data following the selection of the placeholder for the tag;
in response to receiving the typed data, removing the placeholder for the tag and inserting the typed data within the tag;
determining whether the typed data has been removed;
in response to determining that the typed data has been removed, displaying the placeholder for the tag while operating within the second editing mode; and
wherein the text is defined in an XML Schema Definition (XSD) schema file.

10. The method of claim 9, further comprising:
receiving the selection of the placeholder for a tag;
following receipt of the selection of the placeholder, receiving a request to move the tag to a destination location within the electronic document; and
moving the tag and the selected placeholder to the destination location in response to the request.

11. The method of claim 10, wherein the request to move the tag comprises a drag and drop operation.

12. The method of claim 9, wherein the text is defined in a schema library.

13. The method of claim 12, wherein the text is defined in a configuration file.

14. A computer-readable medium having computer-executable instructions stored thereon which, when executed by a computer, cause the computer to perform the method of claim 9.

15. A computer-controlled apparatus capable of performing the method of claim 9.

16. The method of claim 9, wherein the user-defined text includes at least one of the following: images, shapes, and any other type of content that is available in an editing environment.

17. A method for editing an electronic document comprising one or more markup language tags, the method comprising:
providing a first editing mode in which the one or more markup language tags are displayed;
associating a placeholder with the one or more of markup language tags;
exposing a property for each tag in the electronic document, wherein the property for each tag to be programmatically set for each tag in the electronic document to assign a placeholder to the tag; and
displaying the placeholder for each of the one or more markup language tags that is empty while operating in second editing mode in which the markup language tags are not displayed wherein displaying the placeholder further comprises,
determining a text identifying a name for the one or more of the markup language tags associated with the placeholder, the text identifying the name being defined in one of the following: a schema library and a configuration file,
determining whether a user-defined text string has been previously defined by a user,
setting the placeholder equal to the user-defined text if it was determined that the user-defined text string has been previously defined by the user, and
setting the placeholder equal to the text identifying the name for the one or more of the markup language tags associated with the placeholder if it was determined that the user-defined text string has not been previously defined by the user;

not displaying the placeholders while operating in the first editing mode;

receiving a selection of the placeholder for a tag;

receiving typed data following the selection of the placeholder for the tag;

in response to receiving the typed data, removing the placeholder for the tag and inserting the typed data within the tag;

determining whether the typed data has been removed;

in response to determining that the typed data has been removed, displaying the placeholder for the tag while operating within the second editing mode; and wherein the text is defined in an XML Schema Definition (XSD) schema file.

18. The method of claim 17, further comprising removing the placeholder while operating in the first editing mode in which the markup language tags are displayed.

19. The method of claim 17, wherein the user-defined text includes at least one of the following: images, shapes, and any other type of content that is available in an editing environment.

* * * * *